United States Patent
Higo

(10) Patent No.: US 7,932,924 B2
(45) Date of Patent: Apr. 26, 2011

(54) IMAGE-SHAKE CORRECTION APPARATUS

(75) Inventor: Akira Higo, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 877 days.

(21) Appl. No.: 11/471,677

(22) Filed: Jun. 21, 2006

(65) Prior Publication Data

US 2007/0008415 A1 Jan. 11, 2007

(30) Foreign Application Priority Data

Jul. 5, 2005 (JP) .................. 2005-196383

(51) Int. Cl.
*H04N 5/228* (2006.01)
(52) U.S. Cl. .................................. 348/208.11
(58) Field of Classification Search ............. 348/208.11
See application file for complete search history.

(56) References Cited

U.S. PATENT DOCUMENTS

| | | | |
|---|---|---|---|
| 6,034,740 A | 3/2000 | Mitsui et al. | |
| 6,069,656 A | 5/2000 | Silver | |
| 6,429,895 B1* | 8/2002 | Onuki | 348/208.99 |
| 2002/0075286 A1* | 6/2002 | Yonezawa et al. | 345/679 |
| 2003/0007075 A1* | 1/2003 | Masuda | 348/208.11 |
| 2003/0035053 A1* | 2/2003 | Kyuma et al. | 348/208.2 |
| 2005/0068314 A1* | 3/2005 | Aso et al. | 345/419 |

FOREIGN PATENT DOCUMENTS

| | | |
|---|---|---|
| EP | 1 102 107 A2 | 10/2001 |
| EP | 1 489 836 A1 | 12/2004 |
| JP | 10-42307 A | 2/1998 |
| JP | 2001-142103 A | 5/2001 |
| JP | 2003-107554 A | 4/2003 |
| JP | 2004-274701 | 9/2004 |
| JP | 2005-128092 | 5/2005 |
| WO | WO-2005/055589 A1 | 6/2005 |
| WO | WO 2005055589 A1 * | 6/2005 |

OTHER PUBLICATIONS

Japanese Office Action Notice of Reasons for Rejection, Dec. 16, 2010.

* cited by examiner

*Primary Examiner* — Jason Chan
*Assistant Examiner* — Usman Khan
(74) *Attorney, Agent, or Firm* — Birch, Stewart, Kolasch & Birch, LLP

(57) ABSTRACT

The present invention provides an image-shake correction apparatus comprising: an image displacement device that displaces on an image forming plane an image formed by an image-capturing optical system; an image-shake correction device that displaces an image by use of the image displacement device in such a way as to cancel an image shake due to a vibration exerted on the image-capturing optical system; and an output device that outputs to a predetermined external apparatus information on image displacement by the image displacement device, in order to prevent the occurrence of defects due to image-shake correction, information on the image-shake correction can be supplied to an external apparatus that obtains capturing conditions of a camera and implements predetermined processing.

15 Claims, 3 Drawing Sheets

IMAGE-SHAKE CORRECTION APPARATUS

BACKGROUND OF THE INVENTION

1. Field of the Invention

The present invention relates to an image-shake correction apparatus, and particularly to an image-shake correction apparatus that implements image-shake correction in a lens unit used for a virtual system or the like.

2. Description of the Related Art

In recent television broadcasting, a technique has frequently been used in which an actually captured video image captured by a television camera and an electronic video image (CG video image) created by a computer, or the like, are synthesized. As a technique for synthesizing video images, the chroma-key synthesis method is generally known. In the chroma-key synthesis method, a photographic subject that is to be a foreground image of a synthesized video image is captured by a television camera or the like, with, for example, a blue cloth (blue background) as a background. From the resultant video signal, a key signal (an outline signal that indicates the outline of the foreground image) for distinguishing a foreground-image area from a blue-background area is created. Meanwhile, a background image that is to be a background of the synthesized video image is created, for example, by a computer or the like. By cutting based on the key signal the foreground-image area out of the background image and replacing the foreground-image area by the foreground image, the synthesized video image in which the foreground image and the background image are synthesized is created (refer to Japanese Patent Application Laid-Open No. 10-42307 and the like).

In addition, a video image synthesis system (a virtual system), referred to as a virtual studio, has been frequently used in which not only video images are simply synthesized through the chroma-key synthesis method, but also a photographic subject captured actually by a television camera is displayed as if the photographic subject were present in a virtual space (virtual studio) created as an electronic video image.

In a virtual system, a desired virtual space is created by a computer or the like and a virtual camera is arranged within the virtual space. Accordingly, image capturing in the virtual space is implemented virtually by the virtual camera, whereby an electronic video image of the virtual space is created. The capturing conditions for the virtual camera is changed in accordance with the change in the capturing conditions, such as focusing operation, zooming operation, and pan/tilt operation, for a television camera (real camera) that actually captures video images; therefore, a synthesized video image is created that is displayed as if a photographic subject for the actually captured video image were present in the virtual space. In addition, in some cases, the synthesis is implemented in such a way that an actually captured video image is used as a background and an electronic video image is used as a foreground image, or actually captured video images are synthesized.

Additionally, in recent years, an image-shake correction apparatus that corrects an image shake has been used in many cases, due to enhancement of the zoom magnification ratio of a lens unit. An image-shake correction apparatus that is integrally incorporated in a lens unit and an image-shake correction apparatus that is an adapter used, as an auxiliary device, attached to a lens unit are known. For example, an image-shake correction apparatus is known in which, in an image-capturing optical system, a correction lens for correcting an image shake is movably arranged in a direction perpendicular to the optical axis, and when a camera (image-capturing optical system of the camera) is vibrated, the correction lens is driven by a motor in such a way as to cancel the image shake caused by the vibration, thereby correcting the image shake (e.g., refer to Japanese Patent Application Laid-Open Nos. 2001-142103 and 2003-107554 and the like). In addition, image-shake correction methods other than the method in which a correction lens is used that moves in a direction perpendicular to the optical axis. In each image-shake correction method, an image displacement device is provided that displaces optically or electronically the formation position of an image formed by an optical system, in the horizontal or vertical direction within the image formation plane; and image-shake correction is implemented by controlling the amount of image displacement through the image displacement device so as to cancel an image shake.

SUMMARY OF THE INVENTION

Meanwhile, in some cases, when the foregoing image-shake correction apparatus is used in the real camera for a virtual system, respective motions in an actually captured video image and an electronic video image do not coincide with each other. For example, while the camera is vibrated, an electronic video image is created that is displayed as if the virtual camera were also vibrated in conjunction with the movement of the real camera. In contrast, because, in the real camera, the image shake is corrected by the image-shake correction apparatus, the effect of the vibration on the real camera is reduced. Thus, synthesized video images demonstrate a state in which only the portion created through the electronic video image is vibrated, whereby an unnatural synthesized image is displayed.

The present invention has been made in view of the foregoing circumstances and provides an image-shake correction apparatus in which, in order to prevent the occurrence of defects due to image-shake correction, information on the image-shake correction can be supplied to an external apparatus that obtains capturing conditions of a camera and implements predetermined processing.

For that purpose, an image-shake correction apparatus according to a first aspect of the present invention is characterized by including an image displacement device that displaces on an image forming plane an image formed by an image-capturing optical system, an image-shake correction device that displaces an image by use of the image displacement device in such a way as to cancel an image shake due to a vibration exerted on the image-capturing optical system, and an output device that outputs to a predetermined external apparatus information on image displacement by the image displacement device.

According to the present invention, the external apparatus can find out the state of image-shake correction, whereby the external apparatus can implement processing in consideration of the image-shake correction.

The image-forming apparatus according to a second aspect of the present invention is characterized in that, in the first aspect, the output device includes a connector for connecting the image-shake correction apparatus with the external apparatus, by use of a cable.

The second aspect of the present invention enables the image-shake correction apparatus to be connected through the connector with the external apparatus, by use of a cable.

An image-shake correction apparatus according to a third aspect of the present invention is characterized in that, in the first or the second aspect, the output device outputs the information to the external apparatus, by use of an analogue signal.

According to the third aspect of the present invention, the information on image displacement by the image displacement device is outputted (transmitted), by use of the analogue signal; therefore, compared with a case where the information is outputted by use of a digital signal, the circuit is simplified.

An image-shake correction apparatus according to a fourth aspect of the present invention is characterized in that, in the first or the second aspect, the output device outputs the information to the external apparatus, by use of a digital signal.

According to the fourth aspect of the present invention, the information on image displacement by the image displacement device is outputted (transmitted), as serial communication, by use of the digital signal; therefore, in the case where the external apparatus that receives the signal requests transmission by use of a digital signal, conversion, by an A/D converter, of an analogue signal into a digital signal is not required.

An image-shake correction apparatus according to a fifth aspect of the present invention is characterized in that, in the first, the second, the third, or the fourth aspect, the output device outputs a value corresponding to an amount of image displacement by the image displacement device.

The fifth aspect shows one mode of information on image displacement by the image displacement device.

An image-shake correction apparatus according to a sixth aspect of the present invention is characterized in that, in one of the first to the fifth aspect, the output device outputs the information to an image creation apparatus, as the external apparatus, that creates another video image to be synthesized with a video image obtained by capturing an image formed by the image-capturing optical system.

The sixth aspect shows an example of the external apparatus; in the case where, in a video-image synthesis apparatus used in a virtual system, one of video images to be synthesized is created, in addition to an video image from a camera in which the present invention is used, the video images to be synthesized can be created in consideration also of the effect of image-shake correction. Accordingly, a defect can be cancelled in which a synthesized video image demonstrates a partial image shake.

An image-shake correction apparatus according to a seventh aspect of the present invention is characterized in that, in one of the first to the sixth aspect, the image-shake correction apparatus is integrated in a lens unit including the image-capturing optical system or mounted, as an auxiliary device, outside the lens unit.

The seventh aspect shows that the present invention is effective for both cases where the image-shake correction apparatus is integrated in the lens unit and the image-shake correction apparatus is mounted, as an auxiliary device, outside the lens unit.

An image-shake correction apparatus according to a eighth aspect of the present invention is characterized in that, in one of the first to the seventh aspect, the image displacement device displaces an image, by displacing a correction lens that, in the image-capturing optical system, is arranged movably in directions perpendicular to the optical axis.

The eighth aspect shows a mode in which the image-shake correction is optically implemented and a correction lens is used that moves in directions perpendicular to the optical axis so as to displace an image.

An image-shake correction apparatus according to a ninth aspect of the present invention is characterized in that, in the eighth aspect, the output device outputs, as information on image displacement by the image displacement device, a value based on a detected position obtained by a detection device that detects the position of the correction lens or a predetermined target position in the case where the correction lens is moved to the target position.

The ninth aspect shows that, in the case where a value indicating the position of the correction lens or the displacement amount of an image that is displaced corresponding to the position of the correction lens is outputted as information on image displacement by the image displacement device, both cases are possible where a value based on the position, of the correction lens, actually detected by the detection device is outputted and a value based on the target position for control of the correction lens is outputted.

An image-shake correction apparatus according to a tenth aspect of the present invention is characterized in that, in the ninth aspect, the output device outputs a value indicating the detected position or the target position of the correction lens.

The tenth aspect shows a mode in which, as a value indicating the position of the correction lens, a value indicating the actually detected position of the correction lens or a value indicating the target position for control of the correction lens is outputted.

According to the present invention, in order to prevent the occurrence of defects due to image-shake correction, information on the image-shake correction can be supplied to an external apparatus that obtains capturing conditions of a camera and implements predetermined processing.

DETAILED DESCRIPTION OF THE PREFERRED EMBODIMENT

The best mode for embodying an image-shake correction apparatus according to the present invention will be explained in detail below, with reference to the accompanying drawings.

Figure 1:
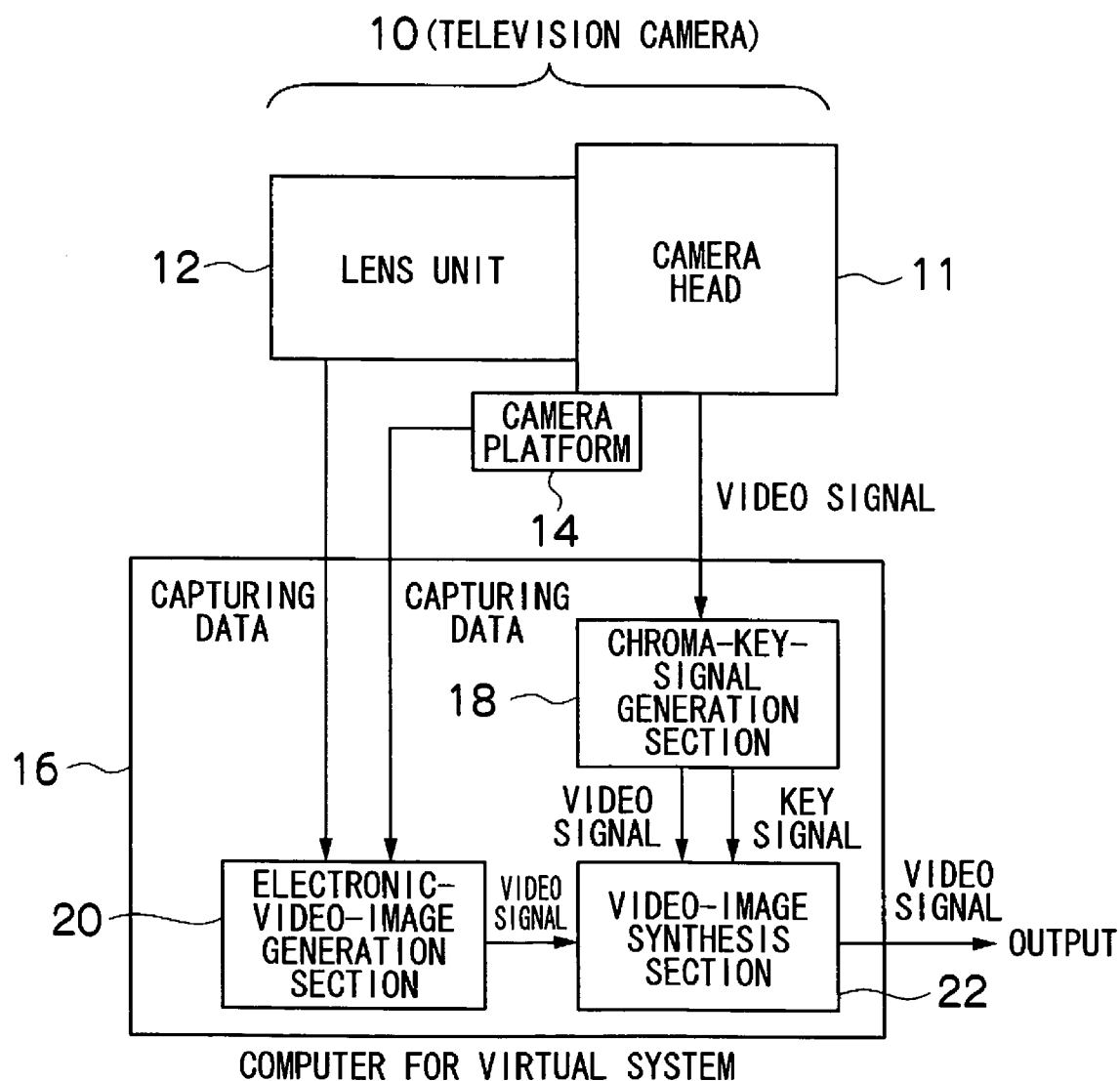
FIG. 1 is a block diagram schematically illustrating the configuration of a virtual system utilizing a lens unit in which an image-shake correction apparatus according to the present invention is integrated.

FIG. 1 is a block diagram schematically illustrating the configuration of a virtual system utilizing a lens unit in which an image-shake correction apparatus according to the present invention is integrated. In FIG. 1, the virtual system is configured mainly of a television camera 10 including a camera head 11 and a lens unit 12, a camera platform 14 that supports the television camera 10, and a computer 16 for the virtual system (referred to as a system computer 16, hereinafter). The camera head 11 is a lens-interchangeable camera used for broadcasting or professional video recording; by mounting on the mount of the camera head 11 the camera cone described later, of an image-capturing optical system (image capturing lens) the camera head 11 can be used for image capturing, as a television camera. The camera head 11 is equipped with an imaging device (such as a CCD) that photoelectrically converts an image formed through the image-capturing optical system of the lens unit 12, a signal processing circuit, which applies predetermined processing to a signal obtained from the imaging device and outputs the processed signal as a predetermined-type video signal, and the like. The video signal, for the captured video image, created through the circuits is outputted from a predetermined output terminal.

The lens unit 12 is provided with the image-capturing optical system (image-capturing lens) that forms the image of a photographic subject and a control system that drives and controls the image-capturing optical system; the image-capturing optical system is configured of various optical components, i.e., provided with a group of movable focus lenses for adjusting the focus, a group of movable zoom lenses for adjusting the zoom-magnification ratio (focal length), a diaphragm for adjusting the brightness, a group of master lenses for forming an image finally, a movable correction lens for image-shake correction, and the like. The control system is configured of respective motors that drive movable constituent elements, of the image-capturing optical system, such as a focus lens, a zoom lens, a diaphragm, a correction lens, and the like, a position sensor that detects respective states (positions) of the movable constituent elements, a control circuit that drives and controls the motors to control the respective positions and speeds of the movable constituent elements to be in predetermined states, and the like. Through the control by the control system, the focus lens and the zoom lens each move back and forth along the optical axis, and the correction lens moves in a direction perpendicular to the optical axis.

In addition, to the lens unit 12, a controller, unillustrated in FIG. 1, is connected that instructs the control circuit the position of the focus lens (focus position) and the position of the zoom lens (zoom position), through the user's operation of a focus demand or a zoom demand and the like. However, in some lens units, the focus lens and the zoom lens are manually driven; that lens units do not require any motor or controller that drives the focus lens and the zoom lens.

The camera platform 14 supports the television camera 10 and is provided with a pan/tilt mechanism that implements pan/tilt operation of the television camera 10 manually or automatically; the camera platform 14 is provided with a position sensor that detects the pivoting angle (pan position), of the television camera 10 supported by the camera platform 14, on a panning plane (on the horizontal plane) and a position sensor that detects the pivoting angle (tilt position), of the television camera 10, on a tilting plane (on the vertical plane).

In the system computer (computer for the virtual system) 16, various kinds of processing items and control items are implemented mainly through computing processing by a CPU; however, FIG. 1 illustrates a schematic configuration in the case where contents of processing implemented by the CPU in the system computer 16 are divided into processing blocks. As can be seen from FIG. 1, the system computer 16 is configured mainly of a chroma-key-signal generation section 18, an electronic-video-image generation section 20, and a video-image synthesis section 22. The outline of video-image synthesis processing in the system computer 16 configured of the foregoing constituent sections will be explained; in the system computer 16, through the chroma-key synthesis technique, a synthesized video image is created that is a synthesis of an actually captured video image, of a photographic subject, captured by a television camera 10 (referred to as a real camera 10, hereinafter), with a blue background and an electronic video image, of a virtual space (virtual studio), captured by a virtual camera.

The image capturing, of an actually captured video image, by the real camera is the work of capturing a real photographic subject (a foreground photographic subject for the foreground image of a synthesis image) to be arranged (synthesized) surrounded by the virtual space; by making the portion, of the synthesis image, excluding the foreground photographic subject to be arranged surrounded by the virtual space a blue background, the image capturing is implemented. Additionally, in this situation, by implementing the zooming operating or the focusing operation of the real camera 10, the foreground photographic subject is captured with a desired capturing condition. The chroma-key-signal generation section 18 of the system computer 16 receives from the real camera 10 the video signal for the actually captured video image captured as described above.

The chroma-key-signal generation section 18 creates, based on the video signal for the actually captured video image received from the real camera 10, a key signal (an outline signal that indicates the outline of the foreground image) for distinguishing the image (the foreground image) area for the foreground photographic subject from the blue-background area and a video signal for the foreground image, and then outputs the key signal and the video signal to the video-image synthesis section 22.

Meanwhile, the electronic-video-image generation section 20 creates, based on creation data preliminarily stored to build a virtual space, an electronic video image, for the virtual space, that is captured by a virtual camera arranged in the virtual space. To the electronic-video-image generation section 20, data on a focus-lens position (focus position), a zoom-lens position (zoom position), and a correction-lens position is provided from the lens unit 12 of the real camera 10, and data on a pan position and a tilt position is provided from the camera platform 14. The data items are sequentially received by the electronic-video-image generation section 20, as capturing data items for recognizing the capturing condition for the real camera 10. Based on the capturing data items, the electronic-video-image generation section 20 makes the capturing condition for the virtual camera that captures the virtual space coincide with the capturing condition for the real camera 10. Accordingly, an electronic video image is created that is displayed as if the virtual space were being captured by the real camera 10. The electronic video image created in the electronic-video-image generation section 20 is outputted to the video-image synthesis section 22.

Any transmission method may be employed for transmitting the capturing data items from the lens unit 12 and the camera platform 14 to the system computer 16; as is the case with analogue transmission by use of an analogue signal, or digital transmission such as serial transmission, arbitrary method can be used. Additionally, in some cases, relay devices that make the signal modes coincide with each other are arranged between the system computer 16 and the lens unit 12 and between the system computer 16 and the camera platform 14.

Based on the key signal supplied to the chroma-key-signal generation section 18, the video-image synthesis section 22 cuts the image in an area into which the foreground image is synthesized (inserted) out of the electronic video image supplied from the electronic-video-image generation section 20. Thereafter, the foreground image supplied from the chroma-key-signal generation section 18 is inserted into the area from which the image has been cut out. As a result, the foreground image in the actually captured video image and the virtual-space image in the electronic video image are synthesized, and the signal for the synthesized image is outputted from the video-image synthesis section 22.

The video signal outputted from the video-image synthesis section 22 is transmitted to a broadcasting apparatus or an editing apparatus other than the system computer 16.

In addition, with regard to synthesis of the actually captured video image obtained from the real camera 10 and the electronic video image, the foregoing method is not the sole one, but other methods may be utilized.

Figure 2:
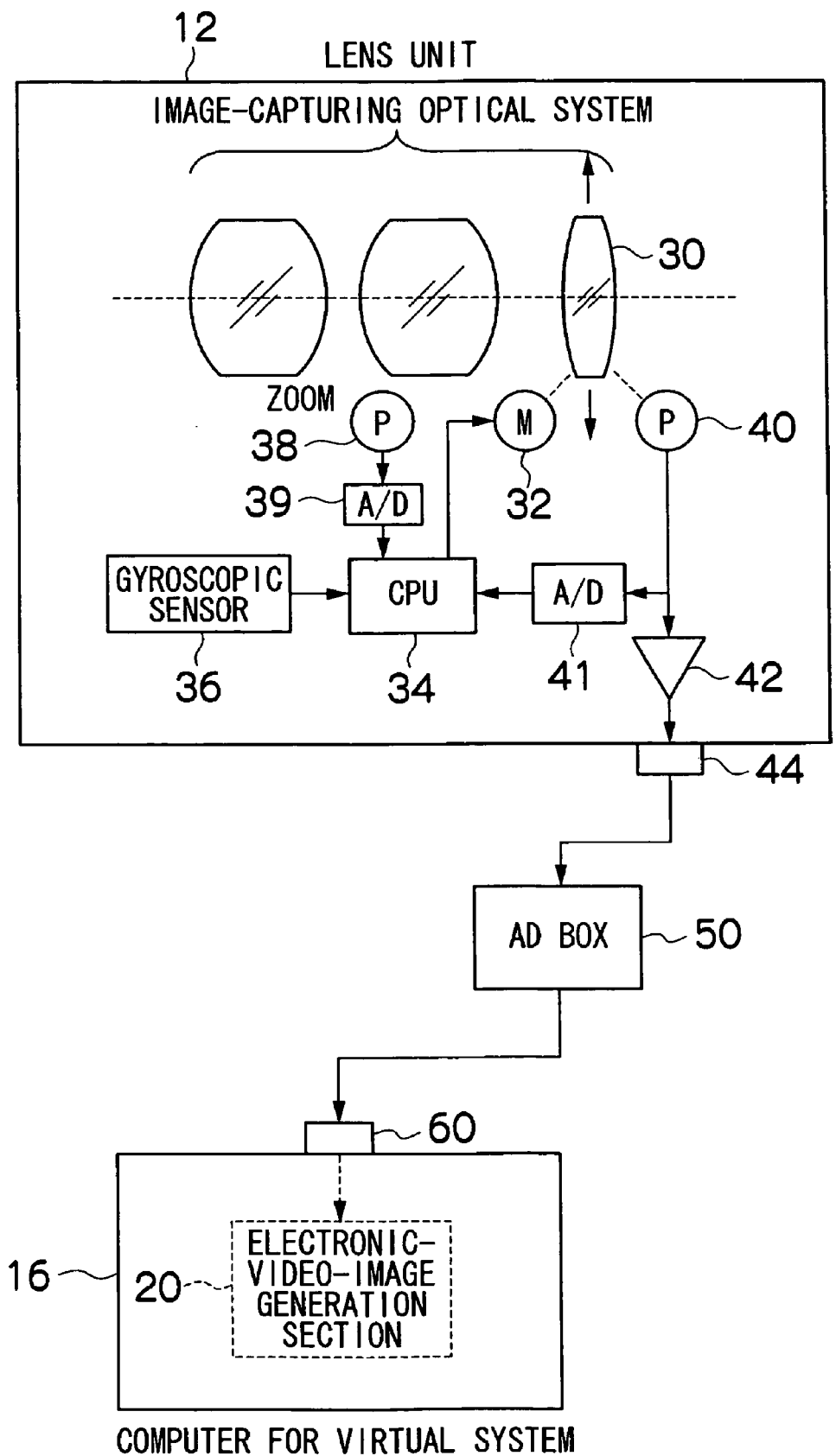
FIG. 2 is a block diagram illustrating only the configuration, in the virtual system in FIG. 1, that relates to image-shake correction.

Next, the configuration and processing, in the virtual system, related to image-shake correction will be explained. FIG. 2 is a block diagram illustrating only the configuration, in the foregoing virtual system, that relates to image-shake correction. As illustrated in FIG. 2, in the image-capturing optical system of the lens unit 12, a correction lens 30 for image-shake correction is arranged, for example, after the other constituent elements of the optical system. The correction lens 30 is adapted to be supported movably in directions (vertically and horizontally) perpendicular to the optical axis of the image-capturing optical system and driven by a motor 32, in the directions. In addition, in FIG. 2, two motors that drive the correction lens 30 in the up-and-down directions and in the left-and-right directions, respectively, are illustrated with the single motor 32.

Meanwhile, as a shake detection sensor that detects a vertical and horizontal vibration of the image-capturing optical system, a gyroscopic sensor 36 that detects the vertical and horizontal angular velocity is provided in the control system of the lens unit 12. In addition, in FIG. 2, two gyroscopic sensors that detect angular velocities in the up-and-down directions and in the left-and-right directions, respectively, are illustrated with the single gyroscopic sensor 36.

Additionally, the control system of the lens unit 12 is equipped with a CPU 34 that integrally controls the entire lens unit 12; the CPU 34 obtains an angular velocity signal outputted from the gyroscopic sensor 36 and computes, based on the obtained angular velocity signal, the positions, of the correction lens 30, that are appropriate for canceling an image shake caused by vibration, i.e., the displacement amounts from a reference position, in the up-and-down directions and in the left-and-right directions, respectively. In addition, by applying integral processing to the angular velocity signal from the gyroscopic sensor 36, an angular signal can be obtained; however, detailed explanation will be omitted. The angular signal indicates the magnitude of displacement, of an image (the magnitude of an image shake), due to a vibration; based on the relationship between the angular signal and the amount of image displacement for the displacement of the correction lens 30, the position, of the correction lens 30, that is appropriate for canceling the image shake caused by a vibration is obtained.

Additionally, depending on the focal length of the image-capturing optical system, i.e., the position of the zoom lens (zoom position), the image-shake magnitude for the same vibration magnitude changes, whereby the position, of the correction lens 30, that is appropriate for canceling the image shake also changes. Therefore, from a position sensor 38 installed in the zoom lens, the CPU 34 obtains through an A/D converter 39 information on the zoom position and computes the position, of the correction lens 30, for canceling the image shake.

The CPU 34 displaces by use of the motor 32 the correction lens 30 in such a way that the position (target position), of the correction lens 30, indicated by the vertical and horizontal coordinates and the respective present position (detected position), of the correction lens 30, obtained from the position sensor 30 coincide with each other. As a result, the image shake is prevented. In addition, two position sensors that detect positions in the up-and-down directions and in the left-and-right directions, respectively, are illustrated with the single position sensor 38. The position sensor 38 outputs an analogue signal for the voltage corresponding to the present position of the correction lens 30; the signal is converted by an A/D converter to a digital signal and then inputted to the CPU 34. Additionally, an image-shake correction apparatus is known in which it is determined whether the angular velocity signal obtained from the gyroscopic sensor 36 indicates an image shake, due to a vibration, to be corrected or an image shake due to the pan/tilt operation intentionally implemented by an operator, and when it is determined that the shake has been caused by the pan/tilt operation, the image-shake correction is stopped. Regardless of whether or not the foregoing processing is implemented, the present invention can be applied to the image-shake correction apparatus.

As described above, as the capturing data that indicates the capturing condition of the television camera (real camera) 10, data that indicates the position of the correction lens 30 is supplied from the lens unit 12 to the electronic-video-image generation section 20 of the system computer 16. A signal-output connector 44 is provided in the lens unit 12; to the signal-output connector 44, the output terminal of the position sensor 40 that detects the present position of the correction lens 30 is connected through a driver 42. Accordingly, a position signal, as an analogue signal, that indicates the vertical and horizontal coordinates of the detected position (present position), of the correction lens 30, detected by the position sensor 40 can be outputted from the connector 44 to a desired external apparatus.

To the signal-output connector 44, a predetermined signal-input connector 60 of the system computer 16 is connected through an AD box 50, by use of a cable. Accordingly, the position signal outputted from the signal-output connector 44 of the lens unit 12 is converted by the AD box 50 into a digital signal and then transmitted to the signal-input connector 60 of the system computer 16. Thereafter, the electronic-video-image generation section 20 of the system computer 16 obtains the position data for the correction lens 30, by use of the position signal received through the signal-input connector 60.

On the other hand, as described above, in addition to the position data for the correction lens 30, the electronic-video-image generation section 20 obtains the data items, as the capturing data items indicating the capturing conditions of the real camera 10, such as the focus position, the zoom position, the pan position, and the tilt position; thus, based on the capturing conditions, the electronic-video-image generation section 20 makes the capturing conditions of the virtual camera that captures the virtual space coincide with the capturing conditions of the real camera 10.

In this situation, a case will be explained in which, regardless of the position of the correction lens 30, the capturing conditions of the virtual camera are set. When the real camera 10 is vibrated, the pan and tilt positions of the real camera 10 are displaced. The virtual camera is also displaced. Accordingly, the electronic video image captured by the virtual camera also demonstrates an image shake corresponding to the pan-position displacement and the tilt-position displacement. In contrast, the image-shake correction makes the image captured by the real camera 10 insusceptible to a vibration; therefore, in the case where the foreground image created from an actually captured video image and the background image created from an electronic video image are synthesized, only the background image demonstrates an image shake, whereby the synthesized image is rendered awkward.

Thus, by obtaining as the capturing data the position data for the correction lens 30 in the real camera 10, the electronic-video-image generation section 20 sets the capturing conditions of the virtual camera, in consideration of the image-shake correction in the real camera 10. In other words, by, as is the case with the real camera 10, implementing the image-shake correction in the virtual camera, the image shake cancelled through the image-shake correction in the real camera 10 is cancelled also in the virtual camera. As a result, the awkward phenomenon is cancelled that, in a synthesized image in which the foreground image created from an actually captured video image and the background image created from an electronic video image are synthesized, only the background image vibrates.

Figure 3:
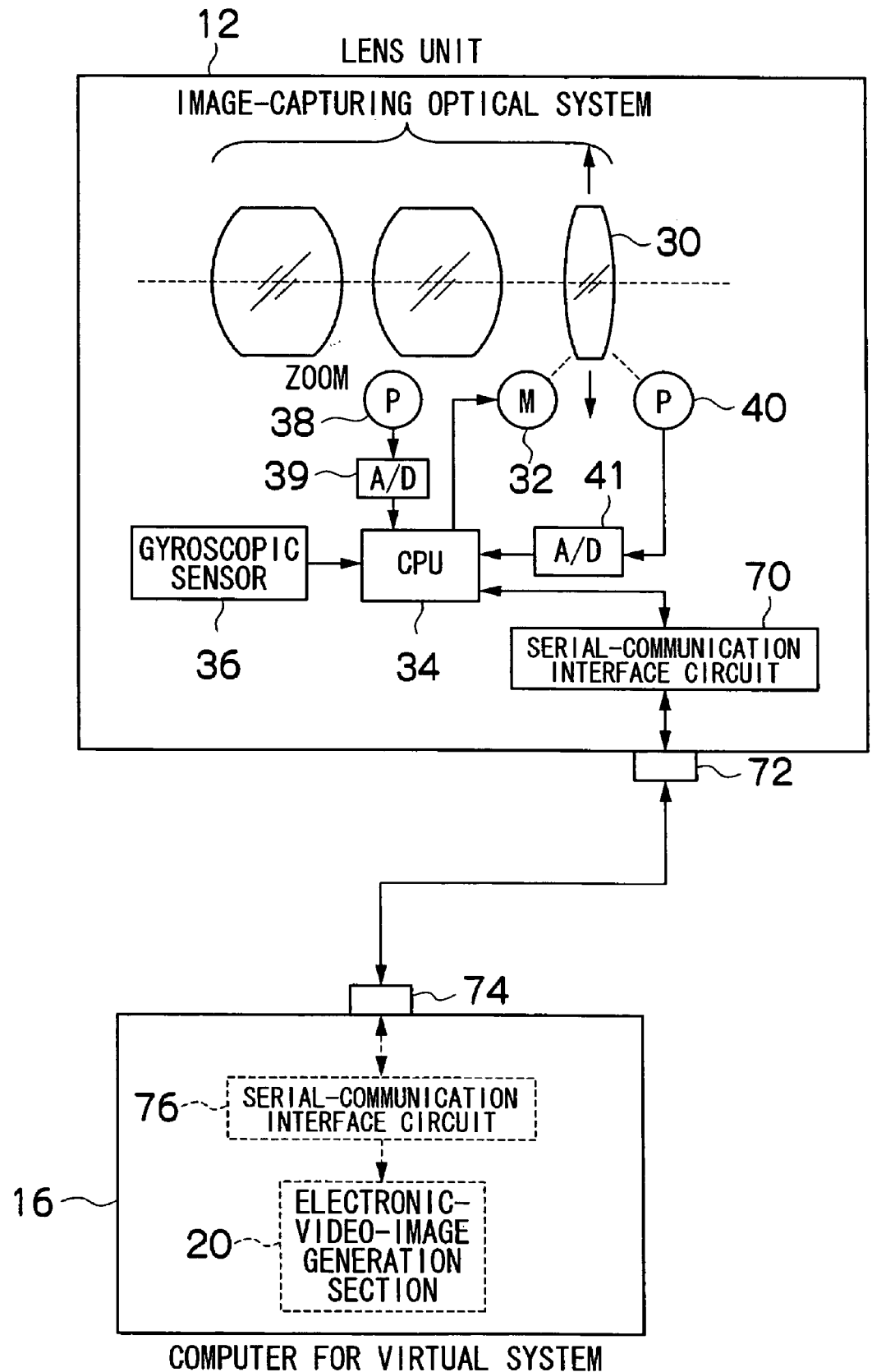
FIG. 3 is a block diagram illustrating another embodiment of only the configuration, in the virtual system in FIG. 1, that relates to image-shake correction.

In the configuration illustrated in FIG. 2, an analogue signal for the voltage corresponding to the position of the correction lens 30 is outputted from the lens unit 12, through the signal-output connector 44; however other configurations may be conceivable. FIG. 3 is a block diagram in the case where the position data for the correction lens 30 is transmitted through serial transmission to the system computer 16. The same or similar constituent elements as those in FIG. 2 are designated by the same reference numerals, and explanations for them will be omitted. In a configuration illustrated in FIG. 3, the CPU 34 reads from the position sensor 40 the present position of the correction lens 30 and outputs a value indicating the present position to a serial-communication interface circuit 70, by use of a digital signal. The serial-communication interface circuit 70 is connected to a serial-communication connector 72 provided in the lens unit 12; to the serial-communication connector 72, a serial-communication connector 74 of the system computer 16 is connected by use of a cable. Accordingly, signal transmission/reception through serial communication is enabled between a serial-communication interface circuit 76 of the system computer 16 and the serial-communication interface circuit 70 of the lens unit 12. Through serial transmission, the serial-communication interface circuit 70 of the lens unit 12 can transmit to the system computer 16 the position data, for the correction lens 30, supplied from the CPU 34; the electronic-video-image generation section 20 obtains the position data, through the serial-communication interface circuit 76.

In the foregoing embodiment, information on the present position (detected position), of the correction lens 30, detected by the position sensor 40 is outputted from the lens unit 12 to the system computer 16; however, instead of the present position of the correction lens 30, the target position, as the position of the correction lens 30 that corrects an image shake, computed by the CPU 34 may be outputted to the system computer 16. Moreover, as long as information other than a value indicating the present position or the target position of the correction lens 30 is a value based on the present position or the target position of the correction lens 30, such as a value indicating the amount of displacement of an image that has been displaced through the displacement of the correction lens 30 to the present position, or a value indicating the amount of displacement, on the image-forming plane, of the image that is displaced through the displacement of the correction lens 30 to the target position, outputting the information to the system computer 16 enables the system computer 16 to implement the same processing as that in the foregoing embodiment. In addition, the amount of displacement, of the correction lens 30, from the reference position is in proportion to the amount of image displacement; therefore, the amount of image displacement versus the position of the correction lens 30 can readily be computed by the CPU 34 in the lens unit 12.

Additionally, in the foregoing embodiment, an aspect has been explained in which an image shake is corrected by the correction lens 30 arranged movably in directions perpendicular to the optical axis; however, the present invention can be applied also to a case where image-shake correction is implemented in accordance with another method. In other words, the present invention enables an image shake due to a vibration to be cancelled by an image displacement device that optically or electronically displaces the position, on the image-forming plane, of an image that is formed by an image-capturing optical system; therefore, regardless of the type of the image displacement device, the present invention can be applied. In this situation, by outputting to the system computer 16 information on the displacement, of the image, by the image displacement device, e.g., the image-displacement amount or a value corresponding thereto, the system computer 16 can implement the same processing as that in the foregoing embodiment.

Moreover, in the foregoing embodiment, a case has been explained in which the image-shake correction apparatus is integrated in the lens unit 12; however, the present invention can be applied even to a case where the image-shake correction apparatus is separated from the lens unit and mounted, as an auxiliary device, outside the lens unit (or integrated in the camera head). In the case where the image-shake correction apparatus is separated from the lens unit, the connector for connecting the image-shake correction apparatus with the system computer 16 may be provided in the image-shake correction apparatus.

Still moreover, in the foregoing embodiment, a case has been explained in which an image-shake correction apparatus according to the present invention is used as an image-shake correction apparatus of the lens unit in a virtual system; however, even when the image-shake correction apparatus is used for other applications, the present invention is effective in the case where a predetermined external apparatus requests information on the image displacement by the image displacement device.

What is claimed is:

1. An image-shake correction apparatus comprising:
    an image displacement device that displaces on an image forming plane an image formed by an image-capturing optical system;
    an image-shake correction device that displaces an image by use of the image displacement device in such a way as to cancel an image shake due to a vibration exerted on the image-capturing optical system; and
    an output device that outputs to a predetermined external apparatus information on image displacement by the image displacement device, wherein
    the output device outputs the information to an image creation apparatus, as the external apparatus, that creates a second video image to be synthesized with a first video image obtained by capturing an image formed by the image-capturing optical system, wherein the image creation apparatus creates the second video image based on the information on image displacement output by the output device, the external device is a separate device external to the image-capturing optical system,
    the second video image is of a virtual space captured by a virtual camera, and
    the first video image is an actually captured video image captured by the image-capturing optical system.

2. The image-shake correction apparatus according to claim 1, wherein
    the output device includes a connector for connecting the image-shake correction apparatus with the external apparatus, by use of a cable.

3. The image-shake correction apparatus according to claim 1, wherein
    the output device outputs the information to the external apparatus, by use of an analogue signal.

4. The image-shake correction apparatus according to claim 2, wherein the output device outputs the information to the external apparatus, by use of an analogue signal.

5. The image-shake correction apparatus according to claim 1, wherein
the output device outputs the information to the external apparatus, by use of a digital signal.

6. The image-shake correction apparatus according to claim 2, wherein
the output device outputs the information to the external apparatus, by use of a digital signal.

7. The image-shake correction apparatus according to claim 1, wherein
the output device outputs a value corresponding to an amount of image displacement by the image displacement device.

8. The image-shake correction apparatus according to claim 2, wherein
the output device outputs a value corresponding to an amount of image displacement by the image displacement device.

9. The image-shake correction apparatus according to claim 3, wherein
the output device outputs a value corresponding to an amount of image displacement by the image displacement device.

10. The image-shake correction apparatus according to claim 5, wherein
the output device outputs a value corresponding to an amount of image displacement by the image displacement device.

11. The image-shake correction apparatus according to claim 1, wherein
the image-shake correction apparatus is integrated in a lens unit including the image-capturing optical system or mounted, as an auxiliary device, outside the lens unit.

12. The image-shake correction apparatus according to claim 1, wherein
the image displacement device displaces an image, by displacing a correction lens that, in the image-capturing optical system, is arranged movably in directions perpendicular to the optical axis.

13. The image-shake correction apparatus according to claim 12, wherein
the output device outputs, as information on image displacement by the image displacement device, a value based on a detected position obtained by a detection device that detects the position of the correction lens or a predetermined target position in the case where the correction lens is moved to the target position.

14. The image-shake correction apparatus according to claim 13, wherein
the output device outputs a value indicating the detected position or the target position of the correction lens.

15. The image-shake correction apparatus according to claim 1, wherein the image creation apparatus creates the second video image such that capturing conditions for the virtual camera are compensated according to the information on image displacement.

* * * * *